United States Patent [19]

Nagashima et al.

[11] 4,156,477

[45] May 29, 1979

[54] BRAKING SYSTEM OF CHAIN SAW

[75] Inventors: Akira Nagashima, Kawasaki; Hisashi Inaga, Tokyo, both of Japan

[73] Assignee: Kioritz Corporation, Tokyo, Japan

[21] Appl. No.: 879,847

[22] Filed: Feb. 22, 1978

[30] Foreign Application Priority Data

Sep. 14, 1977 [JP] Japan ............................ 52-122863[U]

[51] Int. Cl.² ............................................ B60T 13/04
[52] U.S. Cl. ................................... 188/77 R; 30/381
[58] Field of Search .................. 30/381; 188/134–136, 188/140, 166, 77 R, 77 W

[56] References Cited

U.S. PATENT DOCUMENTS

| 3,776,331 | 12/1973 | Gustafsson | 188/77 R X |
| 3,970,178 | 7/1976 | Densow | 30/381 X |
| 3,992,779 | 11/1976 | Marks et al. | 188/77 W X |

Primary Examiner—Duane A. Reger
Attorney, Agent, or Firm—Karl W. Flocks

[57] ABSTRACT

A braking system including a sensing lever operated when the forward portion of a chain saw moves upwardly with a jerk due to a kickback phenomenon or the hand of an operator slips from a handle during operation, a brake device, and a direct-acting interlocking member connecting the sensing lever to the brake device. A force exerted on the sensing lever and a force of a spring locking the sensing lever are both transmitted to the brake device through the interlocking member.

1 Claim, 6 Drawing Figures

BRAKING SYSTEM OF CHAIN SAW

BACKGROUND OF THE INVENTION

This invention relates to a braking system of a chain saw.

While a chain saw is in operation, an accident may happen involving the vigorous upward movement of a chain bar due to the resistance offered by the material being sawed (a kickback phenomenon) or the slipping of the hand of an operator from a handle to be caught in a saw chain. In order to prevent such accident, attempts have hitherto been made to devlop an efficient braking system effective to instantaneously interrrupt the operation of the chain saw when the aforesaid phenomenon occurs.

Such accident occurs unexpectedly and may cost the operator his life. Therefore, any braking system should be able to instantaneously apply the brake to the brake means to stop the sliding movement of the saw chain. There have hitherto been developed many types of braking system. For example, in one type of braking system widely used and known in the art as from U.S. Pat. No. 3,776,331, tilting of a sensing lever unlocks locking means, and permits a spring or other resilient means to interrrupt the rotation of a clutch drum of clutch means by its biasing force, thereby stopping the sliding movement of the saw chain which is driven by the clutch drum. This system is complex in construction and requires a large space for housing the brake mechanism. Also, transmission means for transmitting a force from the sensing lever to the brake mechanism is complex in construction. Thus the braking system described hereinabove has had disadvantages in that it takes time for the force exerted on the sensing lever to be transmitted to the brake mechanism, causing a delay in application of the brake, and that the braking force applied to the saw chain is determined by the resilient force of resilient means used in the chain saw.

When a chain saw is provided with a braking system, it has been popularly practiced to mount sensing lever means forwardly of a front handle for the convenience of applying the brake. This arrangement is rational. However, in view of the construction of a chain saw, this arrangement raises a problem with regard to the designing of a chain saw, because ports for filling tanks with fuel and oil are mostly located in the forward portion of the chain saw main body and the presence of the sensing lever means in this portion of the chain saw presents an obstacle.

SUMMARY OF THE INVENTION

An object of this invention is to provide a braking system of a chain saw which is light in weight and simple in construction and is capable of efficiently applying the brake to the saw chain as safety means for the chain saw, so that it is effective in coping with a kickback phenomenon which might occur during operation of the chain saw.

Another object is to provide a braking system of a chain saw wherein the locking means is formed with a sliding surface on its extending portion for enabling the sensing lever to be tilted rearwardly over a wide range, thereby facilitating filling of tanks with oil and fuel.

In the braking system according to the invention, the number of parts is minimized to provide a simple construction which has not been achieved in the prior art, and the time required for applying the brake is shortened by virtue of a novel feature which enables a braking action to be performed efficiently. In accordance with this novel feature, the braking action is performed not only by the sensing lever which exerts a braking force commensurate with the intensity of a kickback phenomenon when a load consisting primarily of the reaction of the chain saw is applied thereto, but also by resilient means biasing the locking pawl so that the biasing force of the resilient means can be combined with the braking force exerted by the sensing lever.

DESCRIPTION OF THE PREFERRED EMBODIMENT

Figure 1:
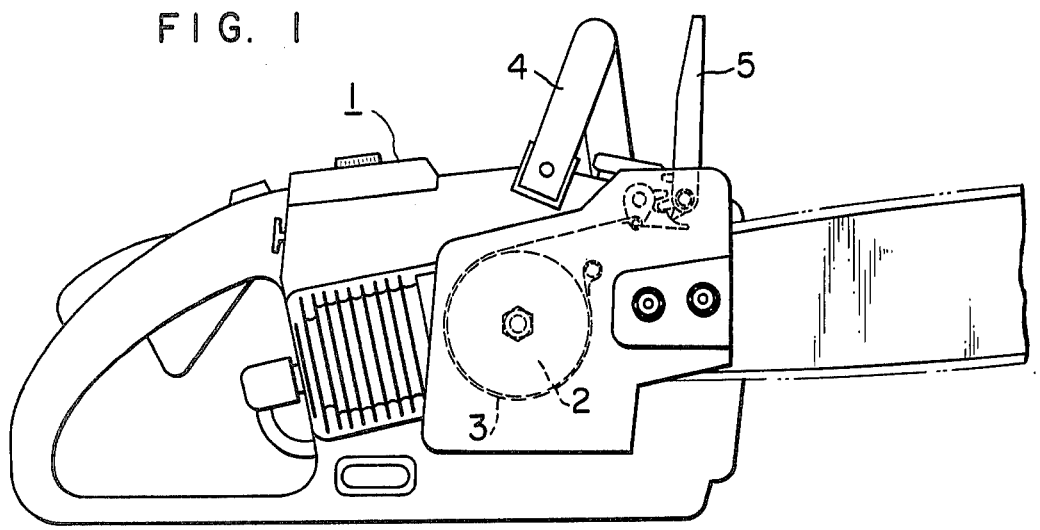
FIG. 1 is a side view of a chain saw.

A preferred embodiment of the invention will be described by referring to the accompanying drawings. A chain saw main body 1 has an output shaft 1a mounting thereon a clutch drum 2 through centrifugal clutch means. A belt 3 secured at one end 3b and connected at the other end 3a to a pin 7a attached to an interlocking member 7 is trained over the outer periphery of the clutch drum 2. The main body 1 has a front handle 4 located in the forward portion thereof, and a sensing lever 5 located forwardly laterally of the front handle 4 and supported by a shaft 5a for tilting movement longitudinally of the main body 1. Disposed adjacent the shaft 5a is a interlocking member support shaft 8 which supports the interlocking member 7 and a locking member 6 for angular rotation. The sensing lever 5 has an actuating pawl 10, a reset pawl 11 and a starting pawl 5b located near the shaft 5a, while the interlocking member 7 has an interlocking pawl 7a projecting toward the sensing lever 5. The actuating pawl 10, reset pawl 11 and interlocking pawl 7a are disposed in one plane, and the starting pawl 5b and locking member 6 are disposed in another plane adjacent thereto.

A spring 9 is wound on the interlocking member support shaft 8 so as to normally urge the locking member 6 to move counterclockwise by its biasing force. The locking member 6 and the starting pawl 5b act as a cam and a cam follower. The locking member 6 includes an extending portion 6b formed with a slide contact surface 6a which coincides with an arc of an imaginary circle having a radius R equal to the length of the starting pawl 5b. The arcuate slide contact surface 6a has at its inner end a locking projection 6c which lockingly engages the starting pawl 5b. In the plane adjacent the plane in which the starting pawl 5b is in locking engagement with the locking member 6, the actuating pawl 10 is in engagement with the interlocking pawl 7a. The interlocking member 7 is formed with a positioning recess 12 so that the interlocking member 7 is positioned when a ball mounted in the main body 1 through a spring is received in the recess 12.

Figure 2:
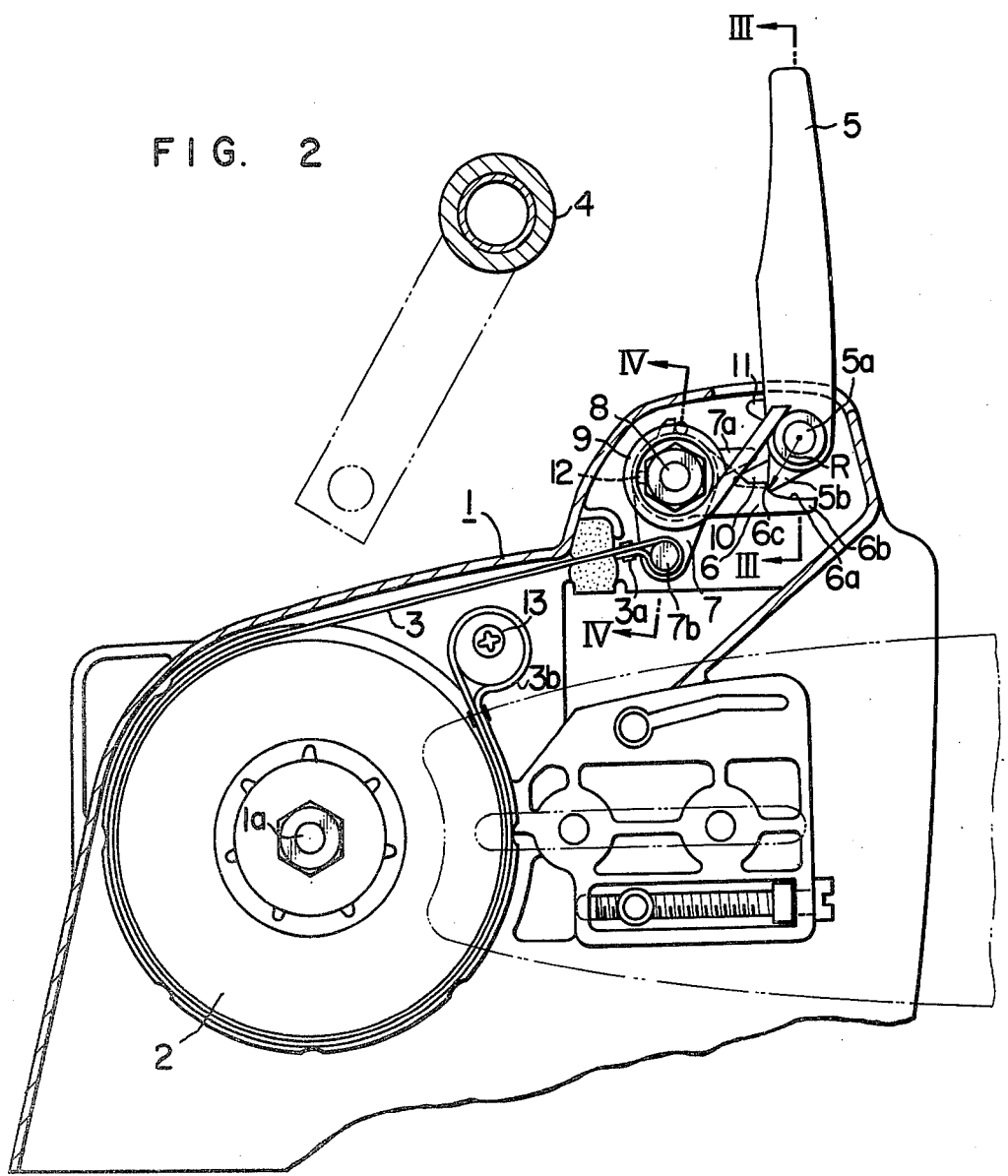
FIG. 2 is a view showing the essential portions of the chain saw shown in FIG. 1, in which the braking system is shown in a nonoperative position.
Figure 3:
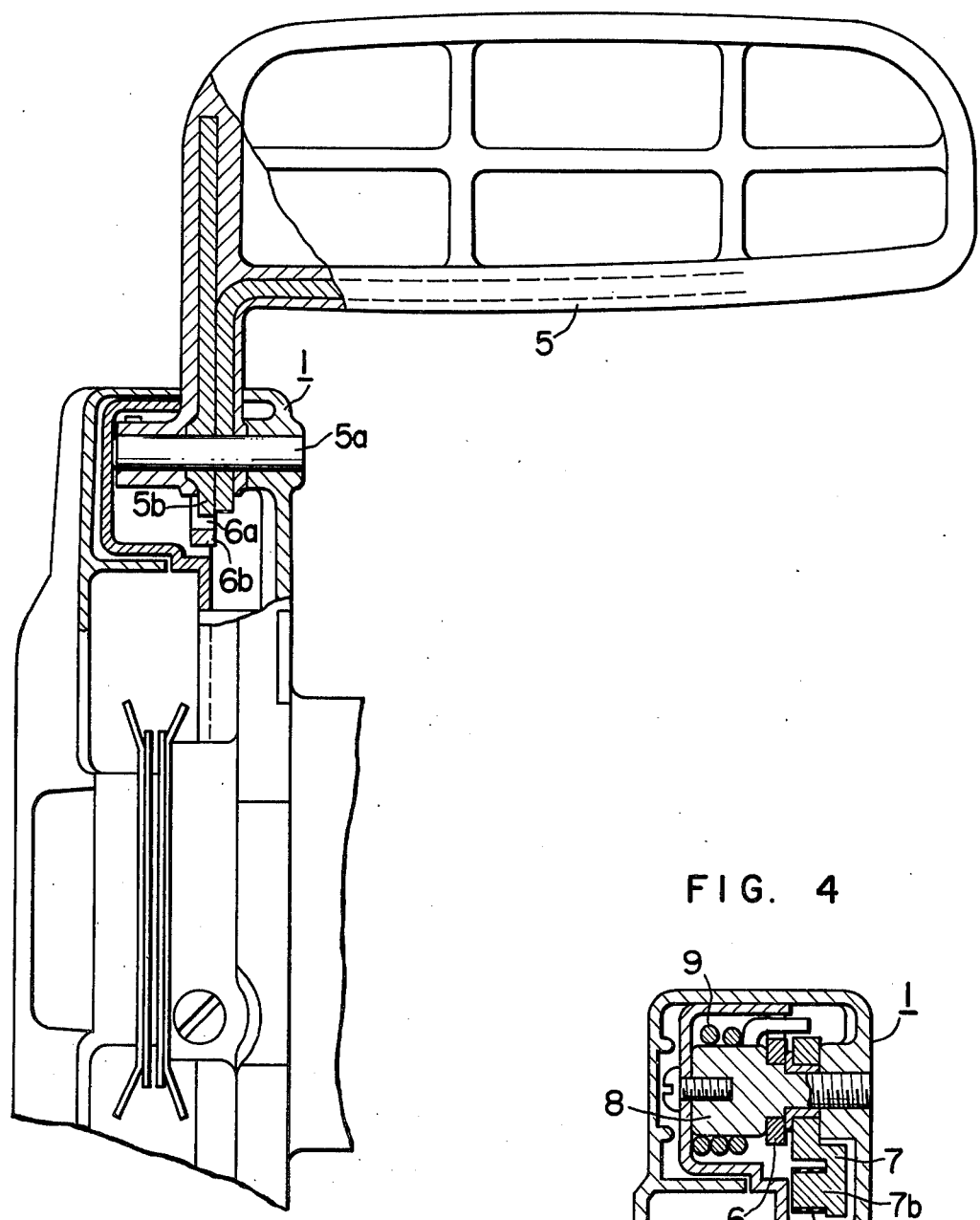
FIG. 3 is a sectional view taken along the line III—III in FIG. 2.
Figure 4:
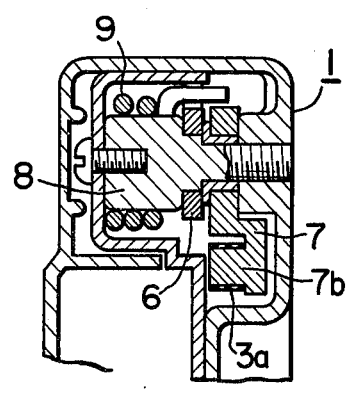
FIG. 4 is a sectional view taken along the line IV—IV in FIG. 2.

In the braking system constructed as aforementioned, the starting pawl 5b is maintained in locking engagement with the locking projection 6c of the locking member 6 by the biasing force of the spring 9, the interlocking member 7 is positioned by means of the ball in the recess 12, and the belt 3 is spaced apart from the outer periphery of the clutch drum 2 by a predetermined clearance, when the braking system is nonoperative as shown in FIG. 2. A plug 13 for securing one end 3b of the belt 3 is eccentrically attached to the main body 1 so as to facilitate adjustment of the tension of the belt 3.

Figure 5:
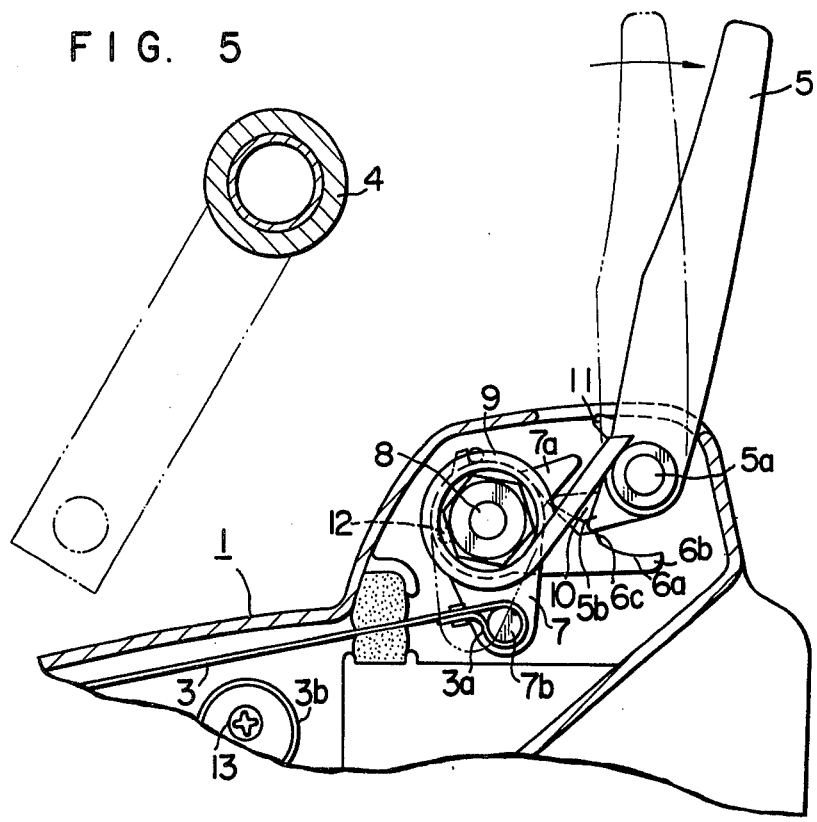
FIG. 5 is a view showing the essential portions of the chain saw shown in FIG. 1, in which the braking system is shown in an operative position.

When the forward portion of the main body 1 moves upwardly with a jerk due to a kickback phenomenon or the hand of the operator slips from the handle and hits the sensing lever 5 with an impact during operation, the starting pawl 5b is angularly rotated clockwise as shown in FIG. 5. This causes the locking member 6 to rotate clockwise against the biasing force of the spring 9, so that the starting pawl 5b passes by the locking projection 6c and the starting pawl 5b is brought out of locking engagement with the locking member 6. At this time, actuating pawl 10 pushes upwardly the interlocking pawl 7a simultaneously as the starting pawl 5b angularly rotates, so that the interlocking member 7 angularly rotates counterclockwise and pulls the belt 3 directly connected thereto. This brings the belt 3 into intimate contact with the outer periphery of the clutch drum 2, and at the same time the locking member 6 now out of locking engagement with the starting pawl 5b pushes the latter upwardly by the biasing force of the spring 9 to thereby increase the force with which the interlocking member 7 pulls the belt 3. This increases the intensity of the braking force applied to the clutch drum 2, thereby abruptly stopping its rotation.

Figure 6:
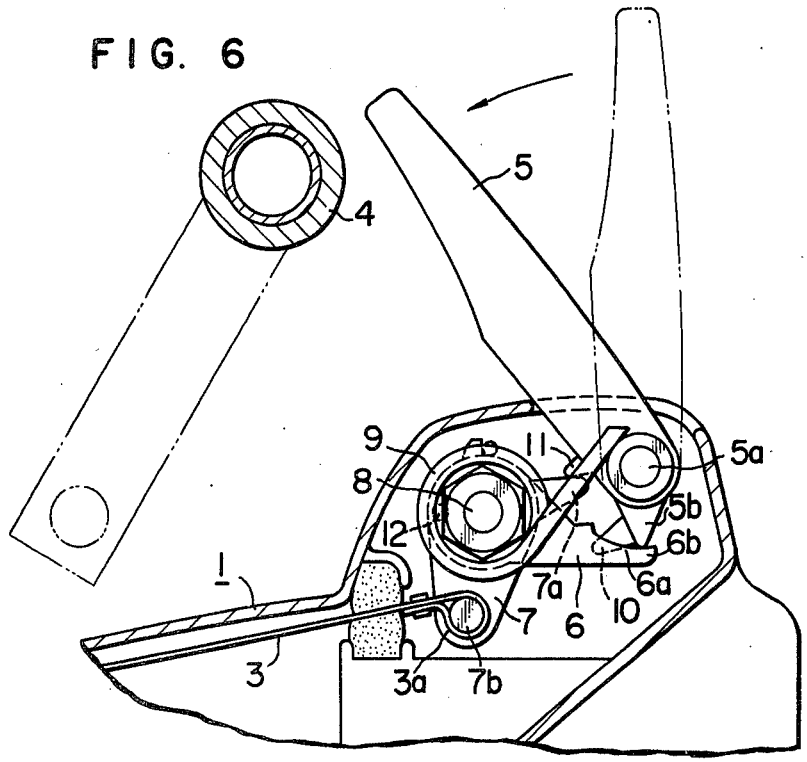
FIG. 6 is a view in explanation of the manner in which the braking system is reset.

By tilting the sensing lever 5 toward the handle 4 as shown in FIG. 6, it is possible to cause the reset pawl 11 to move the interlocking pawl 7a downwardly to thereby causes the interlocking member 7 to angularly rotate clockwise. Then the interlocking member 7 is positioned as the ball enters the recess 12. Thus the belt 3 is released from intimate contact with the outer periphery of the clutch drum 2, thereby allowing the clutch drum 2 to freely rotate. At this time, the starting pawl 5b moves in sliding movement on the slide contact surface 6a of the locking member 6.

In the braking system constructed as aforesaid, the resultant of a force exerted on the sensing lever 5 and a biasing force of the spring 9 is applied to the interlocking member 7. More specifically, the interlocking member 7 which is directly concerned with the application of the braking force is operated by the combined action of the pawls 5b, 10 and 7a. Thus the tilting movement of the sensing lever 5 immediately produces a braking force which is commensurate with the intensity of the kickback phenomenon. The braking system according to the invention can eliminate the waste of time and reduce the time required for applying the brake as compared with braking systems of the prior art which include trigger means of various types. The results of tests show that, whereas it takes 0.07 to 0.12 second for braking systems of the prior art to apply the brake, the braking system according to the invention enables application of the brake to be effected in 0.02 to 0.05 second.

What is claimed is:

1. A braking system of a chain saw comprising:
   friction brake means including a belt trained over the outer periphery of a clutch drum of centrifugal clutch means;
   a sensing lever mounted forwardly of a front handle and adapted to move in tilting movement longitudinally of the chain saw, said sensing lever having a starting pawl;
   an interlocking member located midway between said sensing lever and said belt and having a belt attaching portion on the belt side and an interlocking pawl on the sensing lever side, said interlocking pawl being adapted to be pushed by an actuating pawl of said sensing lever when the brake is applied;
   a locking member arranged side by side with said interlocking member and adapted to come into locking engagement with said starting pawl;
   said locking member including an extending portion having a slide contact surface adapted to be brought into sliding contact with said starting pawl, the said slide contact surface coinciding with an arc of an imaginary circle having a radius equal to the length of the starting pawl; and
   resilient means urging said locking member by its biasing force to move toward said starting pawl;
   said starting pawl being brought out of locking engagement with said locking member when said sensing lever is tilted forwardly of the chain saw to permit a force exerted on the sensing lever to be transmitted to said interlocking member through said actuating pawl and said interlocking pawl and at the same time to permit the biasing force of said resilient means to be transmitted to said interlocking member through said locking member whereby a braking force can be transmitted to said friction brake means.

* * * * *